Aug. 9, 1966    M. F. BALDWIN    3,265,441
WHEEL COVER HAVING RESILIENT PLASTIC RETAINING MEANS
Filed June 1, 1964    3 Sheets-Sheet 2
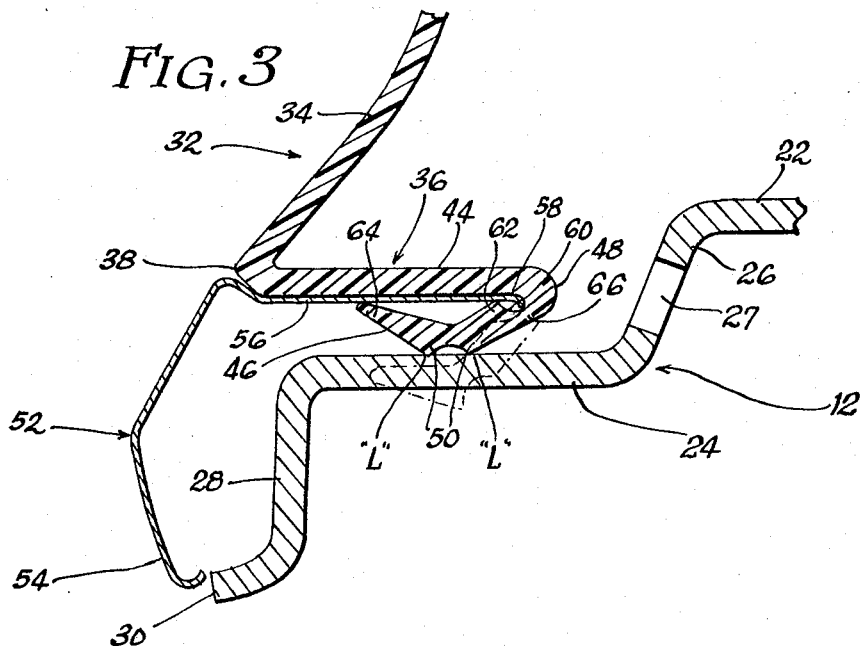
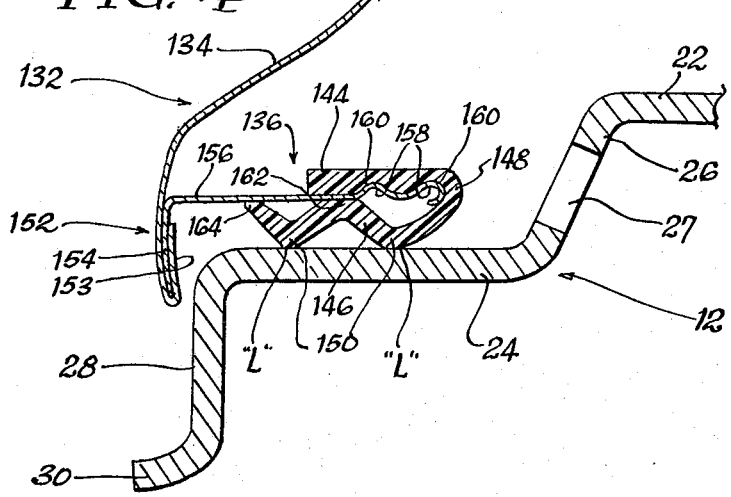
INVENTOR.
Maurice F. Baldwin
BY Horton Davis,
Brewer & Brugman
Attys Aug. 9, 1966          M. F. BALDWIN          3,265,441

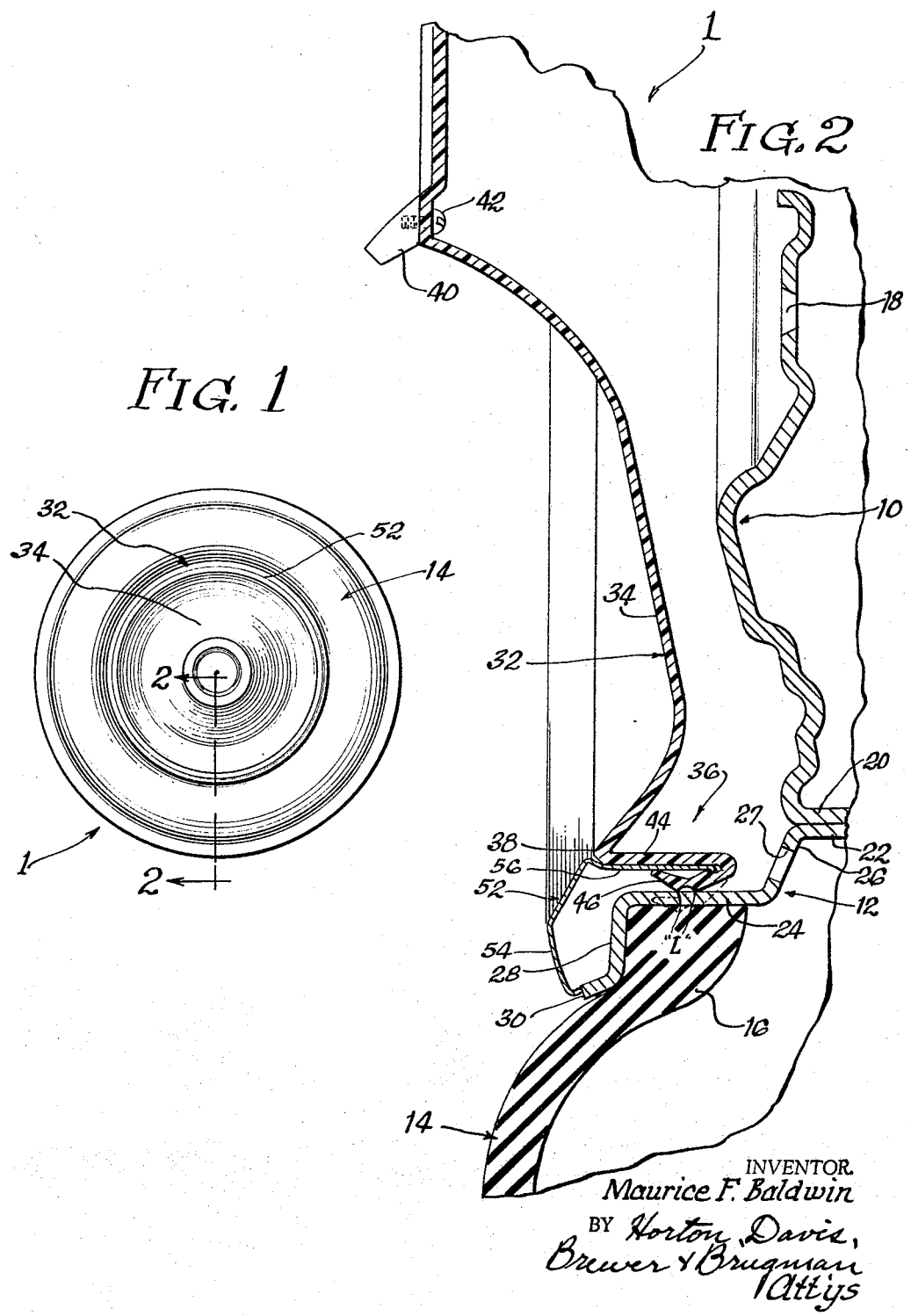

WHEEL COVER HAVING RESILIENT PLASTIC RETAINING MEANS

Filed June 1, 1964          3 Sheets-Sheet 3

INVENTOR
Maurice F. Baldwin
by Horton, Davis,
Brewer & Brugman
Attys

United States Patent Office 3,265,441
Patented August 9, 1966

3,265,441
WHEEL COVER HAVING RESILIENT
PLASTIC RETAINING MEANS
Maurice F. Baldwin, 289 Abbey Road, Birmingham, Mich.
Filed June 1, 1964, Ser. No. 371,256
7 Claims. (Cl. 301—37)

This invention relates to improvements in automotive vehicle wheel structures and especially to novel and improved wheel covers to be used therein.

Increasingly greater use has been made in recent years of wheel cover structures. In addition to the decorative and protective functions of conventional hubcaps, the trend to wheel covers has made possible greater variation in the decoration of automotive vehicle wheels while retaining the protective function provided by hubcaps. It is to novel wheel cover structures which cooperate in a novel manner with wheel structures that this invention is directed.

Conventional wheel cover mounting means utilize a plurality of metallic spring-like fingers or similar means to retain the wheel cover in its wheel covering position. This invention provides an entirely different means for retaining a wheel cover in a wheel covering position while permitting its easy removal in the event it becomes necessary to remove the wheel or inspect the wheel hub. So also does this invention make possible the connection of wheel trim rings to automotive vehicle wheels in a manner heretofore unavailable.

Wheel covers conventionally made of metal have been limited in design possibilities. Both the tooling and processing costs in producing widely divergent shapes and contours in metal wheel covers have confined designers to simply ornamental wheel covers. With the plastic wheel cover structures of this invention it is possible to produce wide varieties of differently configured and highly pleasing wheel cover structures at a cost which for the first time makes them commercially feasible for the mass market.

It is therefore a principal object of this invention to provide novel wheel cover structures mountable on present vehicle tire rims.

A further object of this invention is to provide a novel wheel cover structure in which a wheel cover resiliently engages an annular axially extending tire rim flange along at least one circumferential line of contact.

Yet another object of this invention is to provide novel mounting means in a wheel cover structure for firmly and resiliently urging a wheel cover into engagement with an axially extending annular tire rim flange along spaced circumferential lines of contact when said wheel cover mounting means is in a push-in telescopic relationship to said tire rim flange.

Still a further object of this invention is to provide novel wheel cover mounting means comprising an annular plastic component having an inner leg and an outer leg joined at one end of each, said outer leg having spaced circumferential ribs extending outwardly of said outer leg for firmly and resiliently engaging an annular axially extending tire rim flange along spaced lines of contact.

Also an object of this invention is the provision of a novel wheel cover structure including integral wheel cover body and mounting means of a deformable resilient plastic wherein the mounting means comprise a pair of axially extending legs joined at one end of each and wherein the outermost leg defines outwardly extending circumferential ribs urgable firmly and resiliently by said wheel cover into engagement with an annular axially extending tire rim flange for retaining said wheel cover in a firm wheel covering position.

A further object of this invention is the provision of an all plastic wheel cover structure removably mountable on a tire rim flange.

Yet another object of this invention is the provision of an all plastic wheel cover structure having integrally formed with a wheel covering portion, a plastic trim ring, said plastic wheel cover structure being removably mountable on a tire rim flange by mounting means comprising a pair of axially extending legs defining rib means for engaging said tire rim flange.

Further objects and advantages of this invention will become apparent from the following description and the appended drawings of which:

FIGURE 1 is an outer side elevational view of a wheel structure embodying the improvements of this invention;

FIG. 2 is an enlarged fragmentary side sectional view taken substantially along line 2—2 of FIG. 1 showing, in phantom, the configuration of the mounting means legs in their undeformed relationship prior to their telescopic push-in reception by the tire rim flange;

FIG. 3 is an enlarged fragmentary view of a portion of FIG. 2;

FIG. 4 is an enlarged fragmentary side sectional view of a modified embodiment of a wheel structure of this invention;

Figure 5:
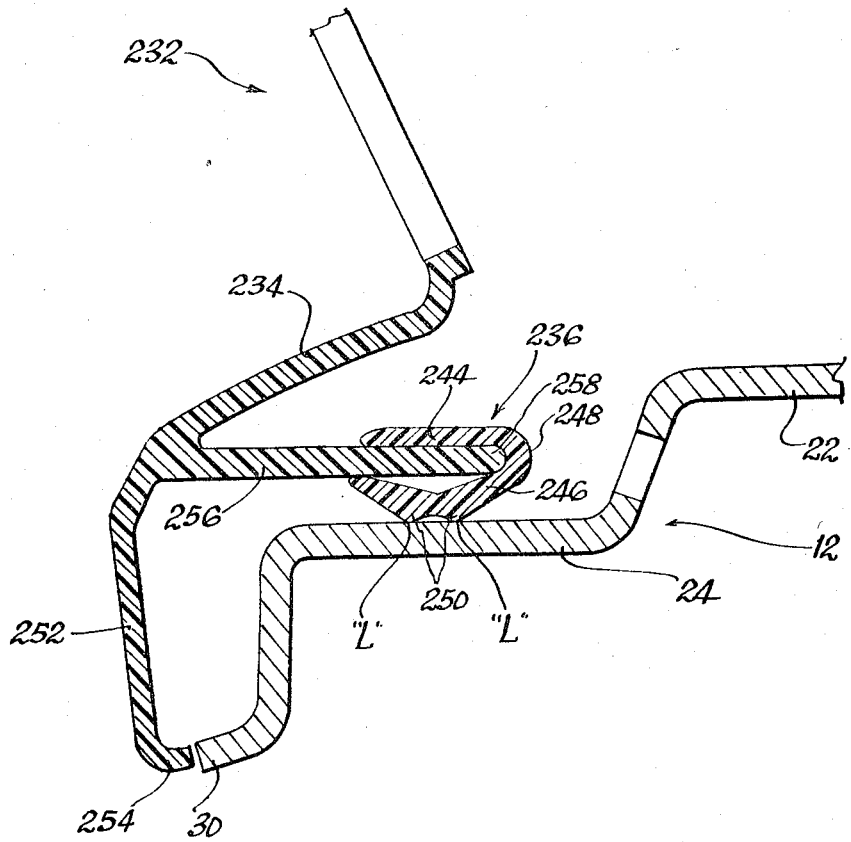
FIG. 5 is an enlarged fragmentary side sectional view of another modified embodiment of a wheel structure of this invention.

Referring first to the embodiment of this invention illustrated in FIGURES 1 to 3, the automotive vehicle wheel structure 1 comprises a wheel body 10, a tire rim 12 and a tire such as a conventional pneumatic tire 14. Tire 14 includes a tire bead 16 retained by tire rim 12.

Wheel body 10 defines a plurality of bolt holes 18 through which bolts extend to anchor wheel structure 1 to an axle of an automotive vehicle and includes a generally axial wheel body attachment flange 20 which parallels and is firmly connected, as by riveting, welding or the like, to a tire rim attachment flange 22. Tire rim 12 also includes an annular flange 24 which extends axially of the wheel structure 1, the outer surface of which flange serves to assist in positioning and retaining tire bead 16 and the inner surface of which serves as the portion of tire rim 12 upon which the wheel cover structure of this invention is mountable. Intermediate attachment flange 22 and annular flange 24 there is provided a tire rim web 26 having an opening 27 through which an air valve (not shown) for pneumatic tire 14 extends. Extending from the outer end of annular axial flange 24 is a bead limiting shoulder 28 which terminates in a generally axially extending terminal flange end 30.

The wheel cover structure 32 of the embodiment of FIGS. 1 to 3 comprises a central wheel body covering segment 34 and cover mounting means shown generally as 36. As shown, central segment 34 and mounting means 36 are integrally formed or molded of a plastic which is deformable but sufficiently resilient to return to its undeformed state even after extended periods of deformation. A suitable plastic which, in addition to having the desired elasticity and resiliency, also is sufficiently rigid and impact resistant to serve for years on an automobile wheel under a wide variety of conditions and subject to extreme variations in temperature is a rigid polyvinyl chloride. While a rigid polyvinyl chloride is a presently preferred plastic, other moldable plastics which form rigid end products of good impact strength, such as polyvinyl chloride copolymers and acrylonitrile-butadience-styrene polymers, may be used as well.

The term plastic has been used herein to indicate the fact that a variety of materials having the desired properties will be suitable for use in accordance with this invention. The term however is limited to natural or synthetic elastic and resilient plastic-like materials and is not intended to include materials such as metals, ceramics or the like.

As seen in FIGS. 2 and 3 mounting means 36 is integrally joined with central covering segment 34 along a joining segment 38. The entire wheel cover may be molded or formed in a single unit or it may be augmented with one or more decorative pieces as desired, as illustrated by decorative piece 40 attached thereto by bolts 42. In this embodiment the all plastic cover provides the advantage of permitting wide variations in contour and configuration as well as in surface coloring and the like at low cost, something unavailable with existing metal covers.

The mounting means 36 of wheel cover structure 32 includes an annular member having a pair of spaced legs, inner leg 44 and outer leg 46. Legs 44 and 46 are joined at their inner ends along a joining segment 48. The outer leg 46 on its outermost surface defines two spaced parallel circumferential rim flange engaging ribs 50. Ribs 50, as will be described, are firmly and resiliently urged into engagement with rim flange 24 along two continuous full-circle parallel lines of contact "L."

Between the confronting surfaces of inner and outer legs 44 and 46 it is possible to position the flange of a trim ring 52. Trim ring 52 consists of an outer transverse annular segment 54 and an integral axially extending annular flange 56, at least a portion of which is confronted by the inner surfaces of both legs 44 and 46. The inner terminal end 58 of flange 56 is downwardly curved to be releasably retained in an annular notch 60 in cover mounting means 36. To assist in retaining trim ring 60 a circumferential protuberance 62 adjacent notch 60 is provided. A second circumferential protuberance 64 coincides with the end of outer leg 44. This also serves to grip and locate flange 56.

In the vicinity of notch 60 cover mounting means 36 includes a neck 66 of substantially reduced thickness to facilitate the firm resilient engagement between the wheel cover structure 32 and the tire rim flange 24 by serving as a hinge means about which outer leg 46 may move with respect to inner leg 44. Neck 66 preferentially causes outer leg 46 to move toward inner leg 44 rather than causing any significant alteration of the relationship of inner leg 44 and covering segment 34 along joining segment 38 or elsewhere in the central covering segment 34.

Thus it is seen that the mounting means 36 produces a resilient positive push-in, pull-out telescopic connection between the tire rim flange and the central covering segment, the connection being provided by the two circumferential ribs 50 along two full-line circles of contact "L" when the mounting means is in the push-in telescopic position.

Mounting of the wheel cover structure is accomplished by positioning it adjacent the tire flange which it is to engage. In that position the inner and outer legs of the wheel cover mounting means are at a first angle of divergence as shown in phantom in FIGS. 2 and 3. The wheel cover structure is then pushed inwardly, and as that occurs the angle of divergence decreases and the force with which the wheel cover is resiliently urged against the tire rim flange increases until the final push-in telescopic relationship shown in full line in FIGS. 2 and 3 is reached. At that point the final angle of divergence between the inner and outer legs is the smallest and the force maintaining the wheel cover structure's contact with the tire rim is at a maximum. It is then possible to insert the flange of a trim ring between the inner and outer legs as has been described by pushing the trim ring flange 56 into engagement with the remainder of the wheel cover structure 32 so that trim ring flange end 58 mates with annular notch 60.

Referring now to FIG. 4 another plastic wheel cover mounting means of this invention is there illustrated. While it shows the use of separate metal covering segment and plastic mounting means, the covering segment may, if desired, be fabricated of plastic as well.

The wheel structure and tire rim may be of the same type described in connection with the embodiment of FIGS. 1 to 3 and as such the corresponding parts are so indicated. With those, the wheel cover structure 132 having a central covering segment 134 and a wheel cover mounting means 136 is adapted to be used.

The wheel cover mounting means 136 comprises integral plastic inner leg 144 and a generally parallel outer leg 146 connected to each other along a joining segment 148. Legs 144 and 146 together with joining segment 148 are formed as by molding of the same plastic material as described in connection with the embodiment of FIGS. 1 to 3. On its outermost surface outer leg 146 defines two circumferential ribs 150 adapted, when in a push-in telescopic relationship to tire rim flange 24, to firmly and resiliently engage flange 24 along two spaced full-circle lines of contact "L."

In addition to its central covering segment 134, the wheel cover structure 132 includes a radially outwardly located trim ring segment 152. Trim ring segment 152 has an inner arm 153 by which a flange arm 154 is firmly held as by crimping. Flange arm 154 terminates in an axially extending annular flange 156 having circumferential detents 158 adjacent and at its innermost end. Detents 158 mate with annular notches 160 in inner leg 144 to render flange arm 154 difficultly movable axially of tire rim 12.

On the inner surface of outer leg 146 a pair of circumferential protuberances 162 and 164 are provided. These protuberances are located outwardly of annular notches 160 and make simultaneous physical contact with annular flange 156.

As is the case in connection with the embodiment of FIGS. 1 to 3, cover mounting means 136 is proportioned so that the circumferential ribs 150 of outer leg 146 are firmly urged into contact with tire rim flange 24. Therefore flange 156 is proportioned to press against protuberances 162 and 164 thereby resiliently forcing ribs 150 into firm engagement with tire rim flange 24 along the two spaced full-circle lines of contact "L" therebetween. Additionally or alternatively the outer diameter of wheel cover mounting means 136 may be slightly greater than the diameter of tire rim flange 24. That will facilitate and assist in firmly and resiliently holding wheel cover structure 132 in contact with tire rim 12.

To place wheel cover structure 132 in its telescopic relationship to tire rim flange 24, flange 156 is inserted between legs 114 and 146 of cover mounting means 136. That assembly is then pushed into contact with the tire rim flange 24, the annular flange 156 assisting in deforming ribs 150 to an extent sufficient to urge them into resilient contact and engagement with tire rim flange 24. The wheel cover structure 132 is then adapted to be resiliently retained indefinitely or until it is necessary to remove it to change the tire. At that time the entire wheel cover structure may be withdrawn, whereupon wheel cover mounting means 136 and ribs 150 return to their original undeformed shape. Alternately, cover mounting means 136 may first be placed in contact with tire rim flange 24 after which wheel cover flange 156 is inserted between legs 144 and 146 thereof and the detents 158 snapped into mating notches 160. So also is it possible to remove wheel cover flange 156 without mounting means 136 by reversing the process just described.

Now referring to FIG. 5, another embodiment of this invention is there shown. In that embodiment, a trim ring will be described as an integral part of the overall wheel cover structure.

Since the wheel structure and its associated tire rim may be the same as that described in connection with the embodiment of FIGS. 1 to 3, corresponding parts have been identified by the same numerals.

With that wheel structure and tire rim wheel cover structure 232 is adapted to be used. Wheel cover structure 232 has a central covering segment 234 and wheel cover mounting means 236. Wheel cover structure 232 may be fabricated of the same materials described in conjunction with the embodiment of FIGS. 1 to 3.

Wheel cover mounting means 236 comprises integral plastic inner leg 244 and a generally parallel outer leg 246 connected together along a joining segment 248. Legs 244 and 246, together with joining segment 248, are formed as by molding, of a resilient material, such as natural rubber or a rubber-like soft vinyl plastic. On its outermost surface, outer leg 246 defines two circumferential ribs 250 adapted, when in position in telescopic relationship to tire rim flange 24, to firmly and resiliently engage tire rim flange 24 along two spaced full-circle lines of contact "L."

In addition to its central covering segment 234, the wheel cover structure 232 includes a trim ring segment 252. Trim ring segment extends radially outwardly of central covering segment 234 and is integral therewith. Trim ring segment 252 terminates in an axially extending arm 254. Near the intersection of trim ring segment 252 and wheel covering segment 234, an axially extending annular flange 256 is provided. At its innermost end 258 it is adapted to accommodate wheel cover mounting means 236, the inner and outer legs of which straddle innermost end 258. The innermost end 258 of annular flange 256 and mounting means 236, including legs 244 and 246, may be proportioned so that annular flange 256 is gripped by legs 244 and 246. Alternatively or additionally, mounting means 236 may be bonded to the innermost end 258 of annular flange 256, as by gluing.

As was the case with the other embodiments of this invention which have been described, cover mounting means 236 is proportioned so that the circumferential ribs 250 of outer leg 246 are firmly urged into resilient contact with tire rim flange 24. Therefore, annular flange 256 is proportioned to resiliently force ribs 250 into engagement with tire rim flange 24 along two spaced full-circle lines of contact "L." Alternatively, or additionally, the outer diameter of wheel cover mounting means 236 may be slightly greater than the diameter of tire rim flange 24 to facilitate and assist in firmly and resiliently holding wheel cover structure 232 in contact with the tire rim 12.

To place wheel cover structure 232 in its telescopic relationship to tire rim flange 24, the innermost end 258 of annular flange 256 is inserted between legs 244 and 246 of cover mounting means 236. As has been stated, the wheel cover mounting means 236 may be bonded, as by gluing, to annular flange 256. That assembly is then positioned against tire rim flange 24, the annular flange 256 assisting in urging ribs 250 into resilient contact and engagement with tire rim flange 24. The wheel cover structure 232 is then adapted to be resiliently retained indefinitely or until it is necessary to change the tire. At that time, the entire wheel cover structure may be withdrawn whereupon wheel cover mounting means 236 returns to its original undeformed shape. Alternately, cover mounting means 236 may first be placed in contact with tire rim flange 24, after which annular flange 256 is inserted between legs 244 and 246 thereof, the said legs cooperating with annular flange 256 and its innermost end 258 to retain the wheel cover structure in a wheel covering relationship to wheel body 12.

Figure 6:
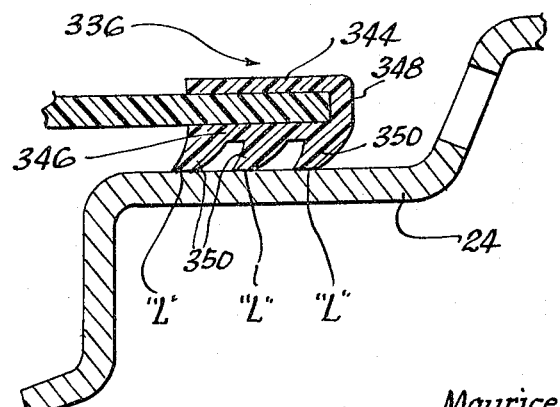
FIG. 6 is an enlarged fragmentary side sectional view of another modified embodiment of a wheel cover mounting means of this invention.

Referring now to FIG. 6, another embodiment of this invention is there shown. The portion illustrated in FIG. 6 is comparable in function to the wheel cover mounting means of FIG. 5.

The wheel itself, like that of the embodiment of FIGS. 1 to 3, provides an axially extending annular tire rim flange 24. The wheel cover mounting means 336 comprise integral plastic inner leg 344 and a generally parallel outer leg 346 connected to each other along a joining segment 348. Mounting means 336 may be formed, as by molding, of a resilient material such as natural rubber or a rubber-like vinyl material. On its outermost surface, outer leg 346 defines a plurality of inclined ribs 350. Ribs 350 are inclined to facilitate mounting but to resist accidental or unintentional removal of the wheel cover assembly since removal tends to straighten the ribs and to urge them against tire rim flange 24 more strongly. The ribs 350, like the ribs of the other embodiments, define spaced lines of contact "L" with tire rim flange 24. Where the ribs are continuous, the lines of contact "L" which are defined are full-circle lines of contact.

Mounting means 336 may be incorporated in a wheel cover assembly in a manner similar to that described in connection with the embodiment of FIG. 5. Their mounting and their removal may take place in similar fashion.

The foregoing detailed description and drawings of presently preferred embodiments of my invention will make it obvious to those ordinarily skilled in the art that various modifications may be made therein without departing from the spirit and scope of my invention.

I claim:

1. In an automotive vehicle wheel cover structure mountable on an axially extending tire rim flange, a central segment for covering a portion of the outside of an automotive vehicle wheel and a mounting means for effectuating a resilient positive, push-in, pull-out telescopic relationship with said tire rim flange and for supportably retaining said central segment in its covering position on the automotive wheel, said mounting means comprising an annular plastic member having an inner axially extending leg and radially outwardly thereof an outer axially extending leg, said outer and inner legs being hingedly joined adjacent one end of each, said outer leg including at least one radially raised rib extending circumferentially around the outermost surface thereof and two spaced circumferential protuberances extending radially inwardly toward said inner leg from the inner surface thereof, means for resiliently urging said rib outwardly into engagement with the tire rim flange along at least one circumferential line of contact therebetween when said mounting means is in its push-in telescopic relationship with said rim flange, said circumferential protuberances engaging and supportably retaining an annular extending flange inserted axially between said inner leg and said outer leg.

2. The automotive vehicle wheel cover structure of claim 1 in which said protuberances are axially spaced, there being one said protuberance at each end of said inner surface of said outer leg, and said rib is positioned axially intermediate said protuberances on said outer surface of said outer leg.

3. The automotive vehicle wheel cover structure of claim 1 in which said central segment and said mounting means are formed integrally of a deformable resilient plastic, and in which said inner leg extends axially away from said central segment and said outer leg extends divergently from said inner leg and toward said central segment from the hinged joint between said legs, said means for resiliently urging said rib outwardly comprising the reactive force in said outer leg and directed radially outward thereof when said outer leg is hingedly deformed to a lesser angle of divergence by engaging said mounting means in its push-in telescopic relationship with said tire rim flange.

4. The automotive vehicle wheel cover structure of claim 3 in which said protuberances are axially spaced, there being one said protuberance at each end of said inner surface of said outer leg, and said rib is positioned axially intermediate said protuberances on said outer surface of said outer leg.

5. An automotive vehicle wheel structure comprising a wheel body, a tire rim connected to said wheel body radially outwardly of said wheel body and having an annular axially extending tire rim flange integral therewith, a pneumatic tire mounted on said tire rim and a wheel cover structure for covering at least a portion of said wheel body, said wheel cover structure comprising a wheel covering segment and a mounting means integrally molded of a resilient plastic, the mounting means comprising an inner leg extending axially away from said wheel covering segment and an outer leg hingedly joined with said inner leg at the outer end thereof and extending generally axially therefrom toward said segment, said inner and outer legs defining a first angle of divergence therebetween prior to mounting said wheel cover on said tire rim, a pair of axially spaced circumferential ribs on the outer surface of said outer legs, and an annular trim ring flange positionable between said inner and outer legs, said legs defining a lesser angle of divergence when said wheel cover is pressed into its mounted position on said wheel, whereat said pair of circumferential ribs, are engaged with said tire rim flange along two axially spaced circumferential lines of pressure contact to resiliently retain said wheel cover in its mounted position on said wheel, and said annular trim ring flange is positively retained between confronting surfaces of said inner and outer legs.

6. In an automotive vehicle wheel structure comprising an inflatable tire mounted on a tire rim having an annular axially extending tire rim flange and a wheel body radially inwardly of and connected to said tire rim for securing said wheel structure to an automotive vehicle, a wheel cover structure for covering at least a portion of said wheel body comprising a central wheel body covering segment and a mounting means for providing a resilient push-in, pull-out telescopic connection between said wheel cover structure and said tire rim flange, said mounting means comprising an annular resilient deformable plastic member having an inner axially extending and radially outwardly thereof an outer axially extending leg, said inner and outer legs being joined adjacent one end of each, said outer leg having at least one raised rib extending circumferentially around the outermost surface thereof and two axially spaced circumferential protuberances on the inner surface thereof for engaging an axially extending annular flange insertable between said inner and outer legs, said outer leg being deformed hingedly inwardly when said mounting means is in its push-in telescopic position, whereby said outer leg is resiliently and firmly urged radially outwardly to engage said rib thereof and said tire rim flange along one circumferential line of pressure contact, and an axially extending annular flange inserted between said inner and outer legs and which is positioned and retained by engagement with said protuberances.

7. The automotive vehicle wheel structure of claim 6 in which said wheel cover central segment and mounting means are integrally formed of a deformable resilient plastic, said legs when undeformed defining a first angle of divergence therebetween, and when deformed by mounting said wheel cover in said push-in telescopic position said legs defining an angle of divergence therebetween which is less than said first angle of divergence, the deformation of said legs firmly and resiliently urging said rib radially outwardly into engagement with said tire rim flange along one circumferential line of pressure contact, and positioning and retaining an axially extending annular flange insertable between said inner and outer legs by engagement with said protuberances.

References Cited by the Examiner
UNITED STATES PATENTS

| 2,005,626 | 6/1935  | Maranville | 301—37 X |
| 2,736,610 | 2/1956  | Waite      | 301—37   |
| 2,812,215 | 11/1957 | Waite      | 301—37   |
| 2,903,300 | 9/1959  | Hurd       | 301—37   |
| 2,963,325 | 12/1960 | Aske et al.| 301—37   |
| 2,996,335 | 8/1961  | Aske       | 301—37   |

BENJAMIN HERSH, *Primary Examiner.*

R. J. JOHNSON, *Assistant Examiner.*